(No Model.)
J. SAVOIE.
PATCHING DEVICE FOR PNEUMATIC TIRES.
No. 574,453. Patented Jan. 5, 1897.
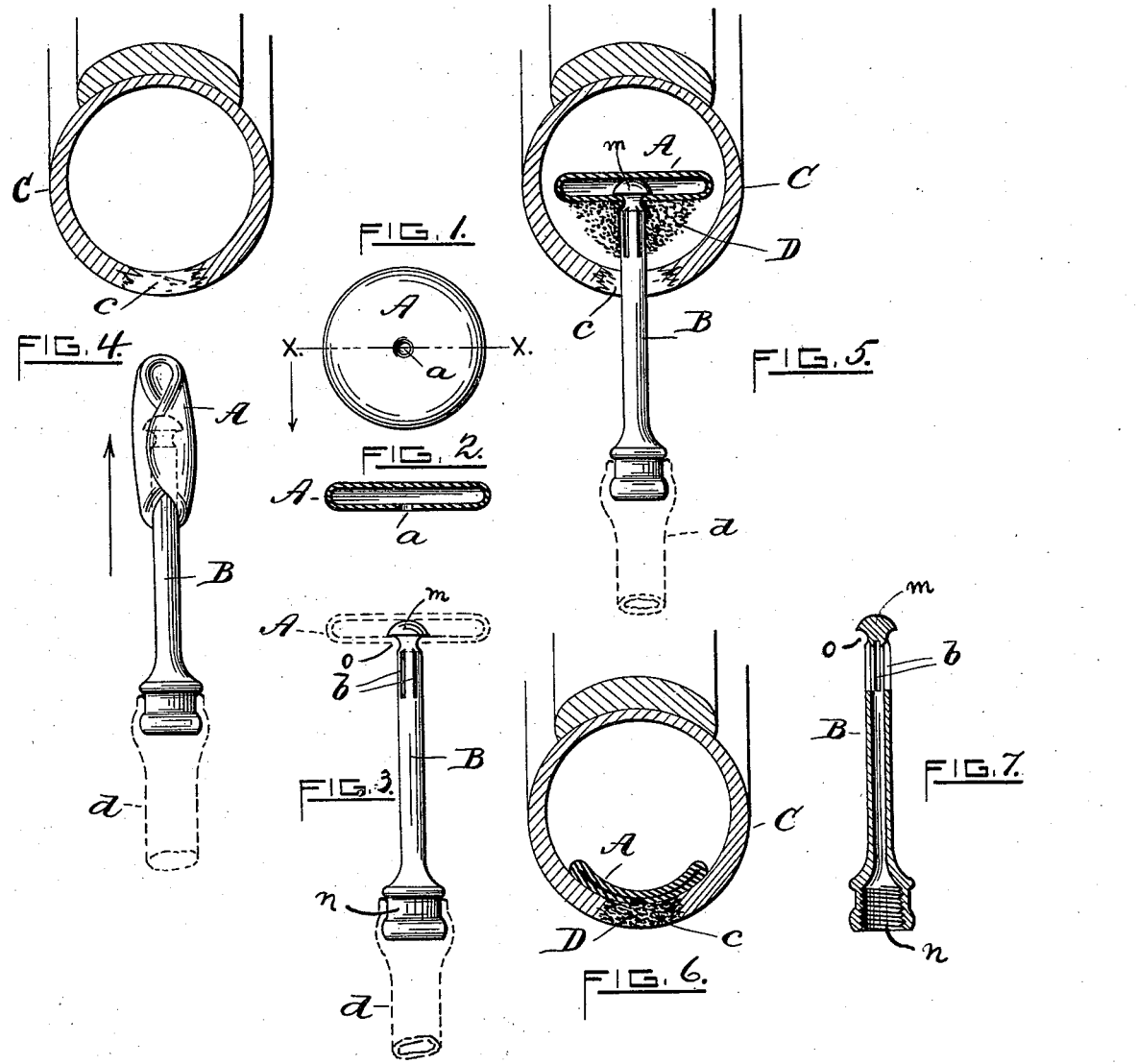
WITNESSES.  
Charles T. Hannigan  
Jos. E. Dorrington
INVENTOR.  
Joseph Savoie  
by James L. Jenks  
Atty.

UNITED STATES PATENT OFFICE.

JOSEPH SAVOIE, OF CENTRAL FALLS, RHODE ISLAND.

PATCHING DEVICE FOR PNEUMATIC TIRES.

SPECIFICATION forming part of Letters Patent No. 574,453, dated January 5, 1897.

Application filed May 18, 1896. Serial No. 592,083. (No model.)

*To all whom it may concern:*

Be it known that I, JOSEPH SAVOIE, a citizen of the United States, residing at Central Falls, in the county of Providence and State of Rhode Island, have invented certain new and useful Improvements in Patching Devices for Pneumatic Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in patching devices for pneumatic tires, in which a hollow sac-shaped patch is introduced into the tire and pressed down upon the rupture or puncture therein and retained in place by suitable cement; and the purpose of my invention is to provide a quick and simple method for patching a torn or punctured tire by an internal patch. I accomplish this purpose by the device shown in the accompanying drawings, in which—

Figure 1 is a hollow rubber sac, constituting the patch; Fig. 2, a sectional view of Fig. 1 through the line X X; Fig. 3, a special tube, the use of which will be explained hereinafter; Fig. 4, an elevation of said tube with the patch wrapped about the end ready to be introduced into the ruptured tire shown just above the tube. Fig. 5 shows the patch and tube in the interior of the tire with the cement about the extremity of the tube. Fig. 6 is a section of the tire in position when the repairing is completed, and Fig. 7 is a detail of the tube shown in elevation in Fig. 3.

The same parts are designated by the same letters throughout the various views.

The chief feature of my invention consists of the flattened rubber patch A, Fig. 1, hollow within and having the opening $a$ upon one of the flattened sides. This hollow patch A is made in varying sizes, in order to render it applicable to almost any size of hole that can be made in a pneumatic tire.

In Fig. 3 B is a hollow tube having its upper extremity rounded at $m$, so as to form a shoulder $o$, as shown in this figure and also in the sectional view in Fig. 7. This tube B has just beneath its upper extremity the slots $b$, connecting with the interior. The other extremity of B is enlarged, as shown at $n$, and into this enlargement is placed, at the proper stage of the repairing, a quantity of cement sufficient to stick the patch A to the ruptured tire in Fig. 4.

A in Fig. 4 shows the hollow patch wrapped about the extremity of B, in order that it may be readily inserted into the rupture $c$ of the tire C, shown in the section just above A. In Figs. 3, 4, and 5 $d$ is an ordinary rubber tube for connecting B with the air-pump used for the inflation of the tire.

In Fig. 5 D represents cement injected through the tube B and thence out of the slots $b$ and upon the lower portion of the hollow patch A.

In Fig. 6 the hollow patch A is seen pressed hard against the surface of the tire, the puncture or rupture $c$ being completely filled with cement and the tire thus restored substantially to its original condition.

The orifice $a$ in the hollow patch A is for the introduction of the rounded end of the tube B.

The method of operating my device is as follows: The rounded head $m$ of the tube B is inserted into the orifice $a$ of the hollow patch A, as shown in Fig. 3. The hollow patch A is then wrapped tightly about the extremity of B, as shown in Fig. 4, and in this manner is introduced into the interior of the tire through the hole $c$. It sometimes happens in practice that the hole $c$ may be too small for the easy introduction of the hollow patch and tube. In such cases the hole $c$ must be enlarged a trifle by a knife-blade or other similar means. The tube B is pushed forward into the tire to an extent sufficient to carry the slots $b$ well into the interior. A quantity of cement sufficient for the purpose is then introduced into the chamber $n$ of the tube B, connection is made with the air-pump, and the cement is thus driven through the tube B and the slots $b$ and clusters about the tube and patch, as shown at D in Fig. 5. The air is then forced through the tube for a short time, thus partially hardening the cement D, as well as creating some pressure with the tire C. When the cement has become sufficiently sticky, the tube B is partially withdrawn, carrying with it the patch A until the latter bears firmly against the inner surface of the ruptured tire C, thus through the medium of the cement D restoring the tire substantially to its original condition. The tube B is easily withdrawn after the patch A has been brought down to its proper position against the inner surface of the tire, and the work is thus completed.

There is no difficulty in the firm "seating" of the patch A, as the air-pressure within the tire forces it down solidly against the puncture or tear.

In addition to its use in mending tires, my device furnishes an easy and rapid means for repairing rubber hose or rubber tubing of any kind.

Having now described my invention, what I claim, and desire to secure by Letters Patent, is—

A device for patching pneumatic tires, consisting of a hollow needle, having an enlarged head upon its inner end, and a series of longitudinal slits or openings through its sides extending to within a short distance of the head, and through which air and cement are forced, and which needle is adapted to receive a patch upon its end and draw it into position against the inner side of the tire after cement has been forced through the slits against the patch, substantially as shown.

In testimony whereof I affix my signature in presence of two witnesses.

JOSEPH X SAVOIE.
his mark

Witnesses:
FRED J. BANCROFT,
ROSE E. DORRINGTON.